Dec. 23, 1941.   C. R. SKINNER   2,266,914
FOLDABLE SUNSHADE
Filed Jan. 30, 1940
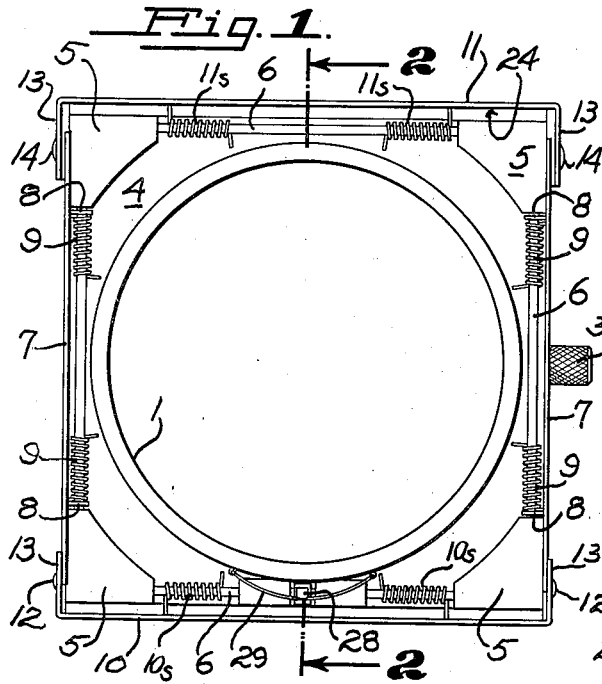
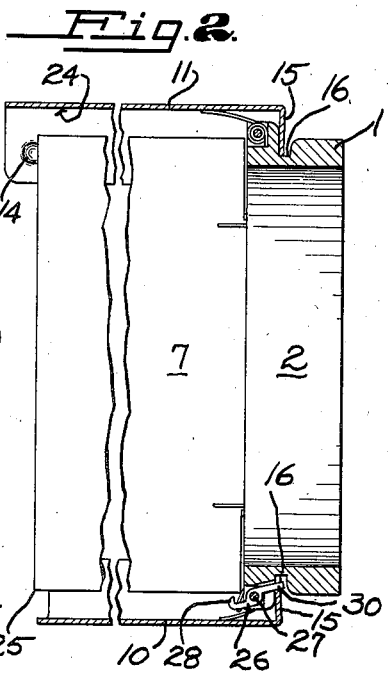
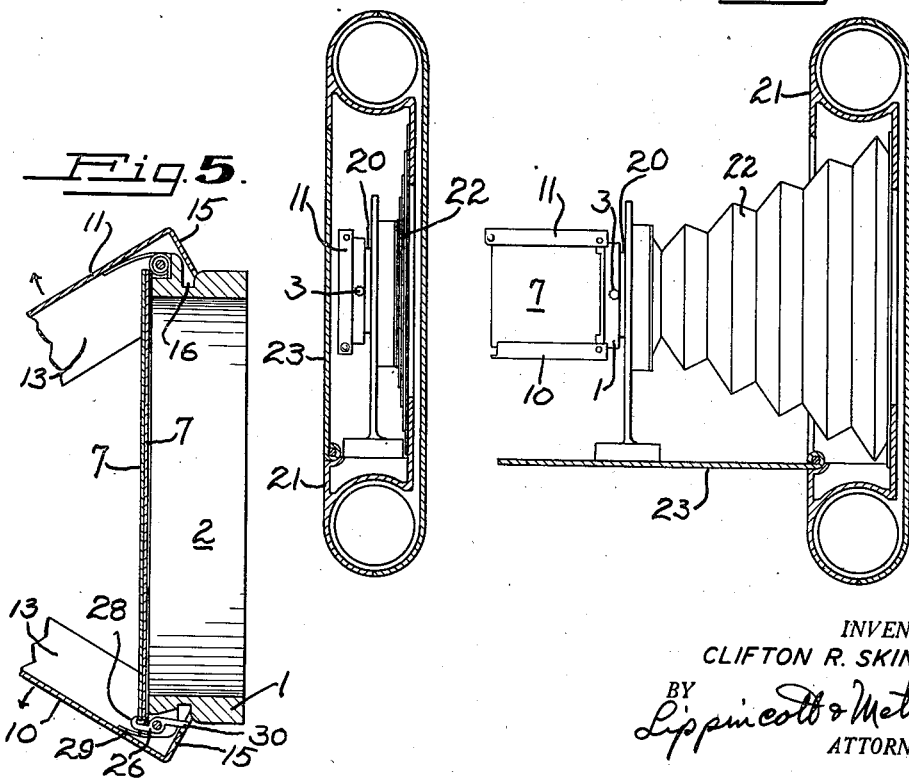
INVENTOR,
CLIFTON R. SKINNER.
BY Lippincott & Metcalf
ATTORNEYS.

Patented Dec. 23, 1941

2,266,914

UNITED STATES PATENT OFFICE 2,266,914

FOLDABLE SUNSHADE

Clifton R. Skinner, San Francisco, Calif.

Application January 30, 1940, Serial No. 316,343

2 Claims. (Cl. 88—1)

My invention relates to sunshades, and more particularly to a foldable sunshade which can be applied to a camera lens to prevent the direct rays of the sun falling thereon during use of the camera in photography.

Among the objects of my invention are: To provide a foldable sunshade for a camera lens, of minimum thickness when folded; to provide a sunshade for a camera lens which can be folded to a minimum thickness and left attached to a folding camera when the camera is closed; to provide a foldable sunshade for a camera lens wherein the opening of the sunshade parts is automatically controlled; to provide a means for preventing scratching of the inside surfaces of a folding sunshade; and to provide a simple, compact, foldable sunshade for a camera lens.

Other objects of my invention will be apparent or will be specifically pointed out in the description forming a part of this specification, but I do not limit myself to the embodiment of the invention herein described, as various forms may be adopted within the scope of the claims.

In the drawing:

Fig. 1 is a top view in elevation of one preferred form of my invention.

Fig. 2 is a longitudinal sectional view of the device shown in Fig. 1, taken as indicated by the line 2—2 in Fig. 1.

Fig. 3 is a diagrammatic drawing of a folding camera with lens extended and the sunshade of Fig. 1 mounted thereon in open position.

Fig. 4 is a diagram similar to Fig. 3, showing the camera closed over the closed sunshade.

Fig. 5 is an enlarged detailed view of the action of the inner flap latch.

It is customary, and highly desirable, to utilize a sunshade on camera lenses when pictures are being taken in camera positions such that the sun's rays might reach the lens. Such sunshades heretofore used have usually been conical or pyramidal fixed shape shades detachably attached to the camera lens barrel. Of course when such fixed shape sunshades are utilized on the camera lens they must necessarily be removed from the lenses of folding cameras before the cameras can be closed. The sunshade of my invention is foldable to a minimum thickness and when so folded can be left on the lens of many enclosed cameras, and the cover of the camera may be closed.

It should also be pointed out that the interior of sunshades is invariably blackened to prevent reflections therefrom into the lens, and in many cases this black material is in the form of a thin film of "fluff" or other rough material deposited on the inside of the sunshade. My invention also may utilize folding flaps so controlled that when they automatically open due to spring action, that the corners of the inner flaps cannot scratch the inner surface of the outer flaps, and therefore do not remove or mar the blackened surface.

My invention may be more fully understood by direct reference to the drawing.

A ring 1 is provided with an inner bore 2 adapted to fit around a camera lens barrel and be held thereon by the use of a thumb screw 3. This is only one of the simple ways to attach a ring to a camera lens barrel, and I do not wish to be limited to any particular manner of fastening the ring 1 to the camera barrel as there are many other ways of attaching such a ring to a lens barrel, now in general use on fixed shape sunshades.

Ring 1 supports a foundation plate 4 which has raised triangular corner pieces 5. Each corner piece is connected to the adjacent corner portion by raised pins 6 forming bearings on which the springs later to be described are mounted. On two opposite pins 6 small inner flaps 7 are mounted by means of bearing brackets 8, being turned inwardly from the lower edges of the flaps, and the inner flaps 7 are urged to open position by means of inner flap springs 9 mounted on the pins 6 carrying the flaps. The inner flaps are planar and have no turned edges, and fold one over the other to lie flat over ring 1.

A small end flap 10 and a larger end flap 11 are mounted on pivot pins 12 extending from plate 4. Both end flaps 10 and 11 are provided with turned sides 13, the turned sides 13 of the larger flap 11 being provided with other indents 14 which snap over the heads of pins 12 on which the smaller end flap rotates to lock all the flaps in closed position. End flaps 10 and 11 are opened by end flap springs 10S and 11S.

End flaps 10 and 11 are prevented from opening any substantial amount beyond a line normal to foundation plate 4 by the use of a turned bottom edge 15 which bears against the bottom of foundation slots 16 in foundation plate 4. The inner flaps, when open, are prevented from passing substantially past a line normal to foundation plate 4 because the inner flaps are held against turned sides 13 of the end flaps. Thus, when open the four flaps form a closed chamber, substantially defining a curve.

Ignoring for the moment further structure shown in the drawing, it will be seen that I have provided a completely operative, foldable sunshade to protect a lens from the sun's rays, in that from the open position shown in Fig. 1 the two inner flaps 7 can be folded across the ring opening 2, one on top of the other, then the smaller end flap 10 folded over the inner flaps, and lastly, the larger end flap 11 folded over the other three flaps until the indents 14 snap over bearing bosses 12 to lock the flaps in closed position. It will be seen, therefore, that the sunshade can be placed with the ring 1 affixed over the lens barrel of a camera, so that the end of the lens barrel extends to a point contacting the innermost side flap when the device is closed. Thus, the effective thickness of the entire sunshade, when closed, is only the thickness of the four flaps, which of course may be made of very thin, stiff material.

Therefore, it can be seen that the open sunshade may be positioned on a camera lens 20, as shown in Fig. 3, of a camera 21, with the bellows 22 thereof extended and the cover 23 open, and in this condition the sunshade will act to shade the lens from the direct rays of the sun, as may be desirable. The sunshade then may be closed and locked in closed position, the bellows 22 of the camera collapsed, and the cover 23 closed over the sunshade and collapsed bellows.

In most cameras of the type shown, when closed, there is sufficient room between the end of the lens barrel and the cover 23 to accommodate the thickness of the closed sunshade. Thus, the sunshade may be carried on the camera when the camera is in collapsed position, which of course cannot be done with the fixed shape type sunshade heretofore commonly used, as there is not sufficient room in the closed camera to accommodate an open sunshade.

As pointed out above, it is highly desirable in efficient sunshades to coat the interior surfaces 24 of the sunshade with a black material to prevent reflections. This might be a dull black lacquer, a rough coating of dull black material, or any similar coating on the interior of the sunshade, and I have provided in my sunshade a means for preventing the corners of the inner flaps from scratching this black material during the opening of the sunshade. If the opening of the sunshade is analyzed, it will be seen that when the larger end flap 11 is freed that the two end flaps will start to open. As they open, the corners 25 of the inner flaps will be urged against the inner surfaces of the end flaps and will bear against these surfaces as they open, thus cutting through or scratching this inner surface along arcuate paths.

In order to prevent such cutting or scratching of the inner surfaces of the end flaps, I have provided a means of holding the inner flaps completely closed until the end flaps have substantially completely opened. Such means are shown in Figs. 1, 2 and 5. A latch 26 is mounted on a bearing pin 27, this latch having at its outer end a hook 28 which is urged inwardly by latch spring 29 to engage the top inner flap when both inner flaps are closed. This condition is shown in enlarged detail in Fig. 5. The trigger end 30 of latch 26 extends in the opposite direction from hook 28 into the path of the bottom edge 15 of the smaller end flap 10 as it opens, so that when the end flap 10 is substantially fully open, and only then, will the trigger end 30 be moved by the bottom turned edge 15 of the end flap 10 to withdraw hook 28 from above the top folded inner flap 7. The inner flaps may then open, and not until then. At that time they can open without corners 25 being able to touch the inner surfaces of the end flaps, as these end flaps have already reached their open position.

Thus, I may put any black coating I may desire on the inside of the sunshade without any danger of it being scratched therefrom during the opening of the device, and without the danger of any such scratches occurring as would allow the inner metal of the flaps to show through the coating.

Thus it will be seen that I have provided a sunshade having several distinct features: First, a sunshade which is foldable to a minimum effective thickness when affixed to a lens barrel, namely, the thickness of the four flaps alone; and second, I have provided a four flap folding sunshade with means for preventing the inner flaps from opening until the outer flaps have fully opened, thus completely preventing any scratching of the outer flaps by the inner flaps.

I claim:

1. A sunshade for a camera lens comprising a ring removably applicable to a lens barrel, means for securing said ring to said mount when applied thereto, a rectangular foundation plate attached to said ring, small side flaps pivoted on each of two opposite edges of said plate and rotatable to fold one over the other to close the opening in the ring, means urging each of said side flaps to upright positions, a larger end flap pivoted to each of the other edges of said plate and rotatable to fold one over the other and over the folded side flaps, the lateral edges of said end flaps being bent over the adjacent side flap edges to position said side flaps when open, spring means urging each of said end flaps to upright positions, a stop means on each of said end flaps moving to engage said foundation plate when said end flaps are upright to maintain said end flaps in upright position against the urge of said spring means, a latch member mounted on said foundation plate and engaging the top side flap to hold both side flaps in closed position when said end flaps are closed, said latch member having a portion thereof in the path of the stop means on one end flap and movable by said latter stop means to release said side flaps as said latter stop means reaches a position engaging said foundation member with said end flaps open.

2. Apparatus in accordance with claim 1 wherein said latch member is spring pressed and shaped to automatically reengage the top side flap when said side flaps are closed.

CLIFTON R. SKINNER.